United States Patent
Guldan et al.

(10) Patent No.: US 12,455,006 B2
(45) Date of Patent: Oct. 28, 2025

(54) CONTROL SYSTEM FOR WORK MACHINE

(71) Applicant: Caterpillar Inc., Peoria, IL (US)

(72) Inventors: Mathew David Guldan, Metamora, IL (US); Michael A. Gilles, Brimfield, IL (US); Kyle David Duryea, Trivoli, IL (US)

(73) Assignee: Caterpillar Inc., Peoria, IL (US)

( * ) Notice: Subject to any disclaimer, the term of this patent is extended or adjusted under 35 U.S.C. 154(b) by 210 days.

(21) Appl. No.: 18/483,828

(22) Filed: Oct. 10, 2023

(65) Prior Publication Data

US 2025/0116092 A1    Apr. 10, 2025

(51) Int. Cl.
*F16H 61/14* (2006.01)
*E02F 9/20* (2006.01)
*E02F 9/22* (2006.01)

(52) U.S. Cl.
CPC .......... *F16H 61/143* (2013.01); *E02F 9/202* (2013.01); *E02F 9/2253* (2013.01)

(58) Field of Classification Search
CPC ....... E02F 9/202; E02F 9/2253; E02F 9/2246; F16H 61/14; F16H 61/143; F16H 2061/146
See application file for complete search history.

(56) References Cited

U.S. PATENT DOCUMENTS

| | | | |
|---|---|---|---|
| 10,300,915 B2 | 5/2019 | Hwang | |
| 10,336,338 B2 | 7/2019 | Nakamura et al. | |
| 10,415,703 B2 | 9/2019 | Tachibanada | |
| 2015/0021136 A1* | 1/2015 | Itazu | F16H 61/143 192/3.28 |
| 2015/0112523 A1* | 4/2015 | Wang | B60W 10/02 180/65.265 |
| 2019/0376259 A1* | 12/2019 | Pence | F16H 59/54 |
| 2023/0265919 A1* | 8/2023 | Tan | F16H 61/143 475/123 |

FOREIGN PATENT DOCUMENTS

| | | |
|---|---|---|
| CN | 110594030 | 12/2019 |
| JP | 2019120350 | 7/2019 |

* cited by examiner

*Primary Examiner* — Timothy Hannon

(57) ABSTRACT

A control system for a work machine includes an engine, a torque converter, and a lock-up clutch assembly. The lock-up clutch assembly includes a lock-up clutch that can be positioned in an engaged state, for bypassing the torque converter, or a disengaged state. The control system includes a controller configured to determine that the engine is in a cranking state, and cause, based on determining that the engine is in the cranking state, the lock-up clutch to be positioned in the engaged state. The controller is also configured to determine that the lock-up clutch is in the engaged state. The controller is further configured to determine, based on an engine speed, that the engine has started, and cause, based on determining that the engine has started, the lock-up clutch to be positioned in the disengaged state.

20 Claims, 6 Drawing Sheets

FIG. 4

CONTROL SYSTEM FOR WORK MACHINE

TECHNICAL FIELD

The present disclosure relates to a work machine, a control system for the work machine, and a method of operating the work machine.

BACKGROUND

Work machines include an engine that generates output power and a torque converter for transmitting the output power to one or more machine components. A lock-up clutch connects an input member and an output member of the torque converter to transmit the output power to the machine components, via the torque converter. During a starting of the engine, working fluids flowing through the torque converter are viscous due to which a load of the engine may increase. Such a condition may increase a starting time of the engine and may also subject the engine to wear and tear. Further, increase in the starting time of the engine may drain a battery associated with the engine at a faster rate, which is not desirable.

U.S. Pat. No. 10,336,338 describes a work vehicle that has a hydraulic source; a control valve that controls a flow of the hydraulic oil discharged from the hydraulic source; and an engine starting device for starting an engine. Further, a control device has a low-temperature state determination unit that determines whether a temperature state of a working fluid of a torque converter is a low-temperature state; and a clutch control unit that when it is determined by the low-temperature state determination unit that the temperature state of the working fluid is not the low-temperature state, controls the control valve in order to switch a lock-up clutch to a non-engagement state, and when it is determined by the low-temperature state determination unit that the temperature state of the working fluid is the low-temperature state, controls the control valve in order to switch the lock-up clutch to an engagement state.

SUMMARY OF THE DISCLOSURE

In an aspect of the present disclosure, a control system for a work machine is provided. The control system includes an engine associated with the work machine. The control system also includes a torque converter configured to transmit a portion of power output from the engine to one or more rotating drive components of the work machine. The torque converter includes an input shaft and an output shaft. The control system further includes a lock-up clutch assembly associated with the torque converter. The lock-up clutch assembly includes a lock-up clutch. The lock-up clutch is positioned in an engaged state, for bypassing the torque converter, or a disengaged state. In the engaged state, the input shaft and the output shaft of the torque converter are coupled via the lock-up clutch. In the disengaged state, the input shaft and the output shaft of the torque converter are not coupled via the lock-up clutch. The control system includes a controller communicably coupled to the lock-up clutch assembly. The controller is configured to determine that the engine is in a cranking state. The controller is also configured to cause, based on determining that the engine is in the cranking state, the lock-up clutch to be positioned in the engaged state. The controller is further configured to determine that the lock-up clutch is in the engaged state. The controller is configured to determine, based on an engine speed, that the engine has started. The controller is also configured to cause, based on determining that the engine has started, the lock-up clutch to be positioned in the disengaged state.

In another aspect of the present disclosure, a work machine is provided. The work machine includes a frame. The work machine also includes one or more rotating drive components supported by the frame. The work machine further includes a control system. The control system includes an engine associated with the work machine. The control system also includes a torque converter configured to transmit a portion of power output from the engine to the one or more rotating drive components of the work machine. The torque converter includes an input shaft and an output shaft. The control system further includes a lock-up clutch assembly associated with the torque converter. The lock-up clutch assembly includes a lock-up clutch. The lock-up clutch is positioned in an engaged state, for bypassing the torque converter, or a disengaged state. In the engaged state, the input shaft and the output shaft of the torque converter are coupled via the lock-up clutch. In the disengaged state, the input shaft and the output shaft of the torque converter are not coupled via the lock-up clutch. The control system includes a controller communicably coupled to the lock-up clutch assembly. The controller is configured to determine that the engine is in a cranking state. The controller is also configured to cause, based on determining that the engine is in the cranking state, the lock-up clutch to be positioned in the engaged state. The controller is further configured to determine that the lock-up clutch is in the engaged state. The controller is configured to determine, based on an engine speed, that the engine has started. The controller is also configured to cause, based on determining that the engine has started, the lock-up clutch to be positioned in the disengaged state.

In yet another aspect of the present disclosure, a method of operating a work machine is provided. The method includes determining, by a controller, that the engine associated with the work machine is in a cranking state. The method also includes causing, by the controller, based on determining that the engine is in the cranking state, a lock-up clutch, of a lock-up clutch assembly, to be positioned in the engaged state. The lock-up clutch assembly is associated with a torque converter that is configured to transmit a portion of power output from the engine to one or more rotating drive components of the work machine. Further, the torque converter includes an input shaft and an output shaft. The lock-up clutch is positioned in an engaged state, for bypassing the torque converter, or a disengaged state. In the engaged state, the input shaft and the output shaft of the torque converter are coupled via the lock-up clutch. In the disengaged state, the input shaft and the output shaft of the torque converter are not coupled via the lock-up clutch. The method further includes determining, by the controller, that the lock-up clutch is in the engaged state. The method includes determining, by the controller, based on an engine speed, that the engine has started. The method also includes causing, by the controller, based on determining that the engine has started, the lock-up clutch to be positioned in the disengaged state.

Other features and aspects of this disclosure will be apparent from the following description and the accompanying drawings.

BRIEF DESCRIPTION OF THE DRAWINGS

FIG. 4 is a flowchart depicting a process of operating the work machine of FIG. 1, according to an embodiment of the present disclosure;

DETAILED DESCRIPTION

Wherever possible, the same reference numbers will be used throughout the drawings to refer to the same or like parts.

Figure 1:
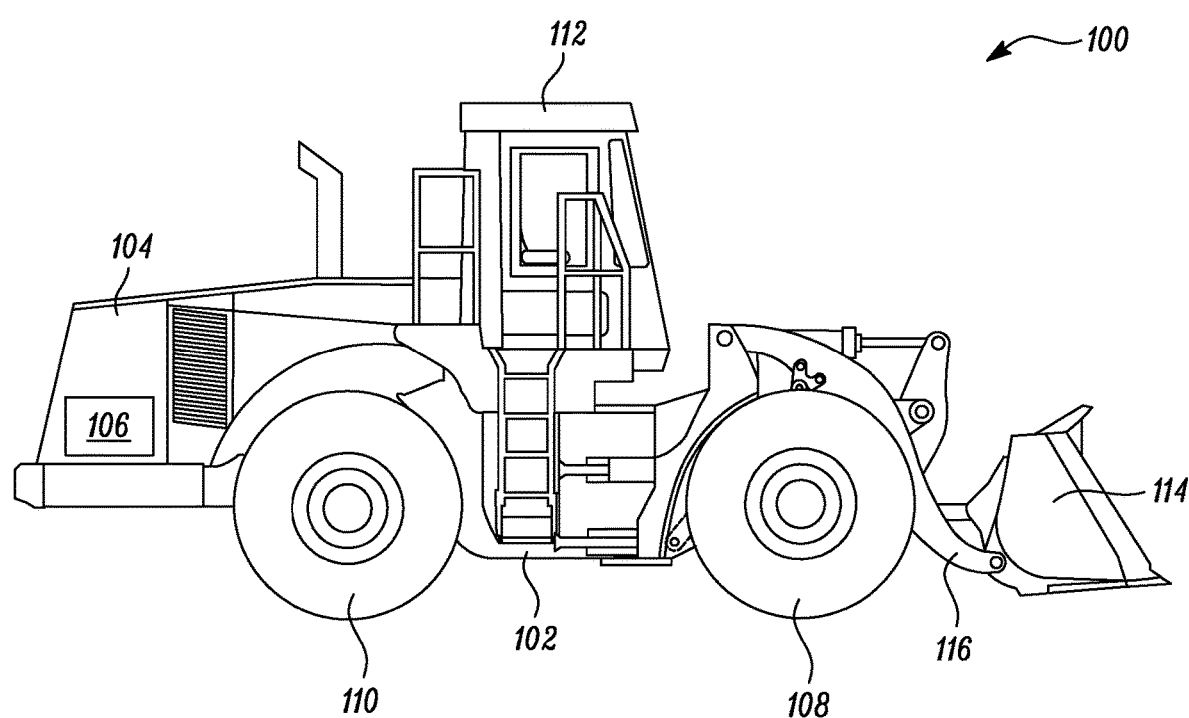
FIG. 1 is a schematic side view of a work machine, according to an embodiment of the present disclosure.

Referring to FIG. 1, a schematic side view of an exemplary work machine 100 is illustrated. The work machine 100 is embodied as a wheel loader that may be used in industries, such as, construction, landscaping, agriculture, and the like. Alternatively, the work machine 100 may be embodied as a mining truck, a dozer, a forklift, an excavator, a track-type tractor, a motor grader, and the like that may be used in various industries to perform one or more work operations.

The work machine 100 includes a frame 102 that supports various components of the work machine 100. The work machine 100 also includes a hood 104 mounted on the frame 102. Further, the work machine 100 includes an engine 106 supported by the frame 102. The engine 106 is disposed within the hood 104. The engine 106 may include an internal combustion engine. The engine 106 may provide power to various components of the work machine 100 for operational and mobility requirements.

The work machine 100 includes one or more rotating drive components 108, 110, 114 supported by the frame 102. In an example, the one or more rotating drive components 108, 110 may include (and may be hereinafter interchangeably referred to as) a pair of front wheels 108 and a pair of rear wheels 110. The front wheels 108 and the rear wheels 110 provide support and mobility to the work machine 100 on grounds. In other examples, the work machine 100 may include two or more pairs of front wheels 108 and/or the rear wheels 110. Alternatively, the work machine 100 may include tracks or drums instead of the wheels 108, 110.

Further, the work machine 100 includes an operator cabin 112 supported by the frame 102. The operator cabin 112 may include one or more input devices/output devices that may enable an operator to control the work machine 100. Further, in an example, the rotating drive component 114 may include (and may be hereinafter interchangeably referred to as) a work tool 114. The work tool 114 is coupled to the frame 102 via a pair of linkage arms 116. The work tool 114 may be used to perform the one or more work operations. The work tool 114 is embodied as a bucket herein. Alternatively, the work tool 114 may be any other type of work tool known in the art, such as, a blade, a fork, and the like, without any limitations thereto.

Figure 2:
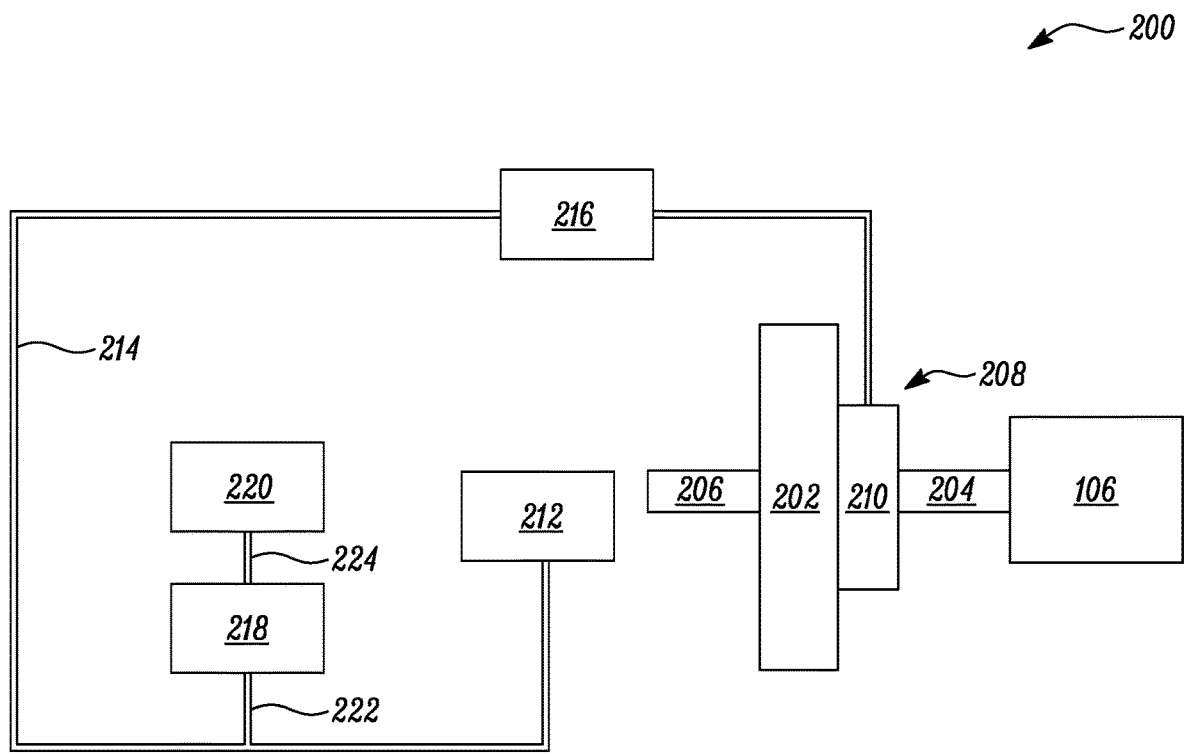
FIG. 2 is a schematic diagram of a control system for the work machine of FIG. 1, according to an embodiment of the present disclosure.

Referring to FIG. 2, the present disclosure relates to a control system 200 for the work machine 100 of FIG. 1. The control system 200 includes the engine 106 associated with the work machine 100. The control system 200 also includes a torque converter 202 that transmits a portion of power output from the engine 106 to the one or more rotating drive components 108, 110, 114 (see FIG. 1) of the work machine 100. The torque converter 202 includes an input shaft 204 and an output shaft 206. Further, the work machine 100 may also include other components, such as, a flywheel (not shown) associated with the engine 106.

The control system 200 also includes a lock-up clutch assembly 208 associated with the torque converter 202. The lock-up clutch assembly 208 includes a lock-up clutch 210. The lock-up clutch 210 is positioned in an engaged state, for bypassing the torque converter 202, or a disengaged state. In the engaged state, the input shaft 204 and the output shaft 206 of the torque converter 202 are coupled via the lock-up clutch 210. In the disengaged state, the input shaft 204 and the output shaft 206 of the torque converter 202 are not coupled via the lock-up clutch 210.

The control system 200 further includes a hydraulic device 212 in selective fluid communication with the lock-up clutch assembly 208. The hydraulic device 212 directs pressurized fluid towards the lock-up clutch 210 to position the lock-up clutch 210 in the engaged state. The hydraulic device 212 may include a pump or an accumulator. Further, the pressurized fluid may include pressurized hydraulic oil. The hydraulic device 212 is in fluid communication with the lock-up clutch 210 via a first fluid line 214.

The lock-up clutch assembly 208 also includes a valve 216 configured to selectively direct pressurized fluid from the hydraulic device 212 towards the lock-up clutch 210. In an open position of the valve 216, the valve 216 allows pressurized fluid to be directed towards the lock-up clutch 210 to position the lock-up clutch 210 in the engaged state. In a closed position of the valve 216, the valve 216 restricts a flow of pressurized fluid towards the lock-up clutch 210 to position the lock-up clutch 210 in the disengaged state. The valve 216 is positioned along the first fluid line 214.

The control system 200 further includes a bypass valve 218 in selective fluid communication with the hydraulic device 212. The bypass valve 218 is disposable in a closed state or an open state. In the closed state, the bypass valve 218 prevents fluid flow therethrough. Further, in the open state, the bypass valve 218 allows fluid flow therethrough. In the illustrated example of FIG. 2, in the closed state, pressurized fluid from the hydraulic device 212 is directed towards the valve 216 of the lock-up clutch assembly 208. In the illustrated example of FIG. 2, in the open state, pressurized fluid from the hydraulic device 212 is directed towards a sump 220 and the valve 216. It should be noted that, in the open state of the bypass valve 218, an amount and a pressure of pressurized fluid being directed towards the sump 220 is higher than an amount and a pressure of pressurized fluid being directed towards the valve 216. Thus, even if the valve 216 remains open, the amount and the pressure of pressurized fluid may not be high enough to retain the lock-up clutch 210 in the engaged state, and the lock-up clutch 210 will transition to the disengaged state. The bypass valve 218 is in fluid communication with the first fluid line 214 via a second fluid line 222. Further, the bypass valve 218 is in fluid communication with the sump 220 via a third fluid line 224. It should be noted that the valve 216 and the bypass valve 218 may include any type of solenoid-operated valve known in the art, without any limitations.

Figure 3:
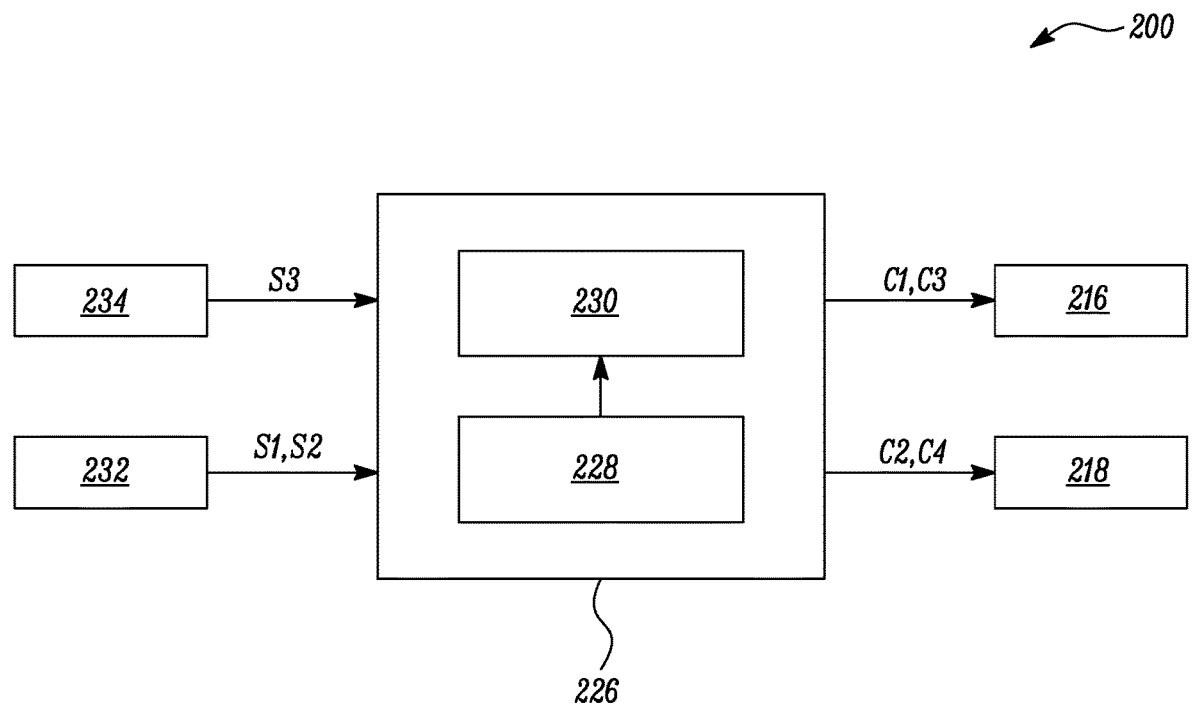
FIG. 3 is a schematic diagram of the control system for the work machine.

Referring to FIG. 3, the control system 200 includes a controller 226 communicably coupled to the lock-up clutch assembly 208 (see FIG. 2). Specifically, the controller 226 is communicably coupled to the valve 216 of the lock-up clutch assembly 208. The controller 226 is also communicably coupled to the bypass valve 218. The controller 226 includes one or more memories 228 and one or more processors 230. The one or more memories 228 may include any means of storing information, including a hard disk, an optical disk, a floppy disk, ROM (read only memory), RAM (random access memory), PROM (programmable ROM), EEPROM (electrically erasable PROM), and/or other computer-readable memory media. For example, the memories 228 may store data, such as, software applications, algorithms, instructions, and arithmetic operations.

Further, the processors 230 are communicably coupled to the memories 228. The processors 230 may execute various types of digitally stored instructions, such as, software applications or algorithms, retrieved from the memories 228, or a firmware program which may enable the processors 230 to perform a wide variety of operations. It should be noted that the processors 230 may embody a single microprocessor or multiple microprocessors for receiving various input signals and generating output signals. Numerous commercially available microprocessors may perform the functions of the processors 230. Each processor 230 may further include a general processor, a central processing unit, an application specific integrated circuit (ASIC), a digital signal processor, a field programmable gate array (FPGA), a digital circuit, an analog circuit, a microcontroller, any other type of processor, or any combination thereof. Each processor 230 may include one or more components that may be operable to execute computer executable instructions or computer code that may be stored and retrieved from the memories 228.

Further, the controller 226 determines that the engine 106 (see FIG. 2) is in a cranking state. In an example, the controller 226 may be in communication with a crank position sensor (not shown) to determine that the engine 106 is in the cranking state. In another example, when an ignition switch (not shown) used for starting the engine 106 is manipulated to a start position, an input signal may be sent to the controller 226 to indicate that the engine 106 is in the cranking state. In other examples, the controller 226 may determine that the engine 106 is in the cranking state based on one or more characteristics of a starter motor (not shown) associated with the engine 106, without any limitations. It should be noted that the disclosure is not limited to a technique in which the controller 226 determines that the engine 106 is in the cranking state.

Further, the controller 226 causes, based on determining that the engine 106 is in the cranking state, the lock-up clutch 210 to be positioned in the engaged state. Specifically, to position the lock-up clutch 210 in the engaged state, the valve 216 is positioned in the open position while the bypass valve 218 is in the closed state, so that pressurized fluid from the hydraulic device 212 is directed towards the lock-up clutch 210. Thus, when the engine 106 is in the cranking state, the lock-up clutch 210 is in the engaged state and the bypass valve 218 is in the closed state. In order to position the lock-up clutch 210 in the engaged state, the controller 226 may transmit a first control signal C1 to the valve 216 to position the valve 216 in the open position. The positioning of the valve 216 in the open position may allow pressurized fluid to flow towards the lock-up clutch 210 thereby causing the lock-up clutch 210 to transition to the engaged state.

The controller 226 also determines that the lock-up clutch 210 is in the engaged state. The controller 226 determines that the lock-up clutch 210 is in the engaged state based on an input speed S1 of the torque converter 202 or an output speed S2 of the torque converter 202. In an example, the input speed S1 may correspond to a speed of the input shaft 204 (see FIG. 2) and the output speed S2 may correspond to a speed of the output shaft 206 (see FIG. 2). For this purpose, the controller 226 may be communicably coupled to a speed sensor 232 associated with the input shaft 204 or the output shaft 206 to determine the input speed S1 or the output speed S2, respectively. In some examples, the controller 226 may determine that the lock-up clutch 210 is in the engaged state based on a comparison between the input speed S1 and the output speed S2. It should be noted that the disclosure is not limited to a technique in which the controller 226 determines that the lock-up clutch 210 is in the engaged state.

If the controller 226 determines that the lock-up clutch 210 is in the engaged state, the controller 226 keeps commanding the valve 216 to retain the valve 216 in the open position. Moreover, the controller 226 also causes, based on determining that the lock-up clutch 210 is in the engaged state, the bypass valve 218 to be positioned in the open state.

In order to position the bypass valve 218 in the open state, the controller 226 may transmit a second control signal C2 to the bypass valve 218. As mentioned above, when the bypass valve 218 is positioned in the open state, pressurized fluid is directed towards the sump 220 (see FIG. 2) and the valve 216. It should be noted that, when the bypass valve 218 is in the open state, the amount and the pressure of pressurized fluid being directed towards the sump 220 is higher than the amount and the pressure of pressurized fluid being directed towards the valve 216. Thus, even if the valve 216 remains open, the amount and the pressure of pressurized fluid may not be high enough to retain the lock-up clutch 210 in the engaged state, and the lock-up clutch 210 will transition to the disengaged state.

Further, the controller 226 determines, based on an engine speed S3, that the engine 106 has started. In an example, the controller 226 is in communication with an engine speed sensor 234 to receive a value of the engine speed S3. Further, the controller 226 determines that the engine 106 has started based on a comparison between the value of the engine speed S3 and a predetermined rotational speed value for the engine 106. If the value of the engine speed S3 is greater than the predetermined rotational speed value V1, the controller 226 determines that the engine 106 has started. The predetermined rotational speed value may be pre-stored in the memories 228 of the controller 226. It should be noted that the disclosure is not limited to a technique in which the controller 226 determines that the engine 106 has started.

Furthermore, the controller 226 causes, based on determining that the engine 106 has started, the lock-up clutch 210 to be positioned in the disengaged state. In order to position the lock-up clutch 210 in the disengaged state, the controller 226 may transmit a third control signal C3 to the valve 216 to position the valve 216 in the closed position. The positioning of the valve 216 in the closed position causes the lock-up clutch 210 to be positioned in the disengaged state.

Further, the controller 226 also causes, based on determining that the engine 106 has started, the bypass valve 218 to be positioned in the closed state. In order to position the bypass valve 218 in the closed state, the controller 226 may transmit a fourth control signal C4 to the bypass valve 218. Thus, when the engine 106 has been determined to be started, the lock-up clutch 210 is in the disengaged state and the bypass valve 218 is in the closed state.

Figure 4:
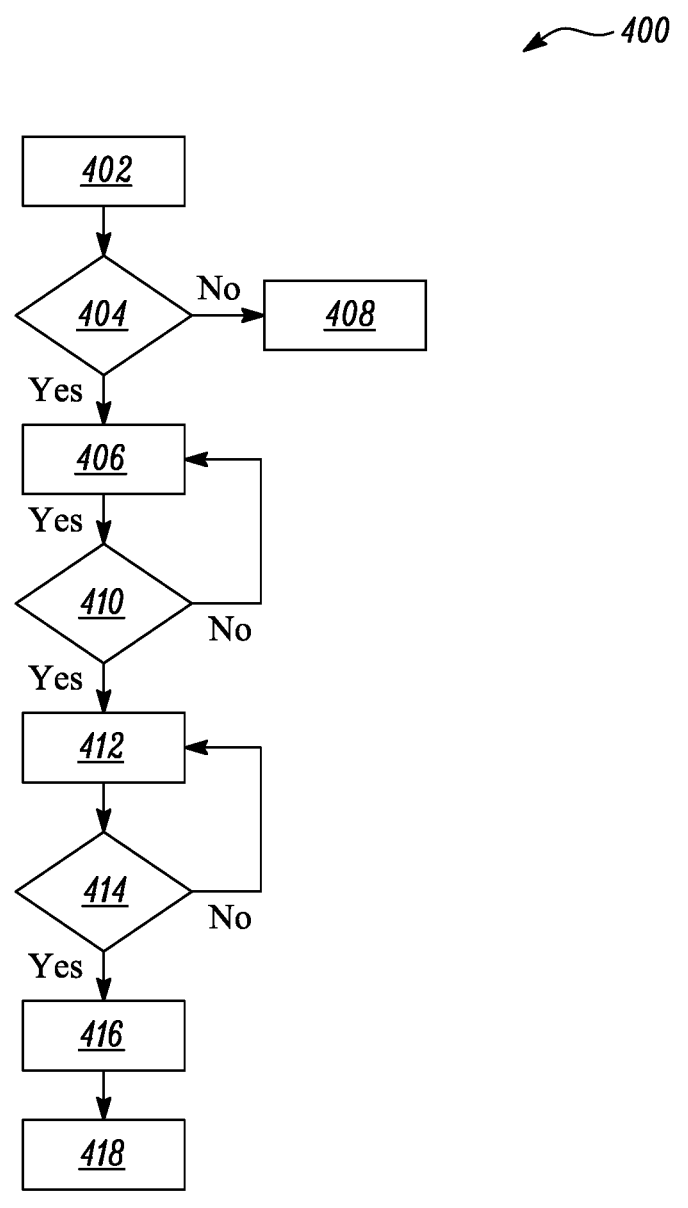

FIG. 4 is an exemplary flowchart depicting an exemplary process (or algorithm) 400 for operating the work machine 100. The process 400 may be stored in the memories 228 and retrieved for execution by the processors 230. At a block 402, the process 400 begins operation.

At a block 404, the controller 226 determines if the engine 106 is in the cranking state. If the engine 106 is in the cranking state, the process 400 moves to a block 406. At the block 406, the controller 226 causes the lock-up clutch 210 to be positioned in the engaged state and the bypass valve 218 to be retained in the closed state. However, at the block 404, if the controller 226 determines that the engine 106 is not in the cranking state, the process 400 moves to a block 408. At the block 408, the controller 226 retains the lock-up clutch 210 in the disengaged state and the controller 226 retains the bypass valve 218 in the closed state.

From the block 406, the process 400 moves to a block 410 at which the controller 226 determines if the lock-up clutch 210 is in the engaged state. At the block 410, if the controller 226 determines that the lock-up clutch 210 is in the engaged state, the process 400 moves to a block 412. At the block 412, the controller 226 retains the lock-up clutch 210 in the engaged state and causes the bypass valve 218 to be positioned in the open state. However, at the block 410, if the controller 226 determines that the lock-up clutch 210 is not in the engaged state, the process 400 moves back to the block 406.

From the block 412, the process 400 moves to a block 414. At the block 414, the controller 226 determines if the engine 106 has started, based on the engine speed S3. If the controller 226 determines that the engine 106 has started, the process 400 moves to a block 416. At the block 416, the controller 226 causes the lock-up clutch 210 to be positioned in the disengaged state and the bypass valve 218 to be positioned in the closed state. However, at the block 414, if the controller 226 determines that the engine 106 has not started, the process 400 moves back to the block 412. Further, from the block 416, the process 400 moves to a block 418 at which the process 400 ends operations.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the control system 200 for the work machine 100. The controller 226 of the control system 200 causes the lock-up clutch 210 to be positioned in the engaged state, from the time when the engine 106 is in the cranking state until the engine 106 has started. The operation of the lock-up clutch 210 in the engaged state during the starting of the engine 106 bypasses use of the torque converter 202. Further, by positioning the lock-up clutch 210 in the engaged state, a load of the engine 106 may be reduced and a starting time of the engine 106 may be improved, i.e., the engine 106 may start within a shorter time.

Figure 5:
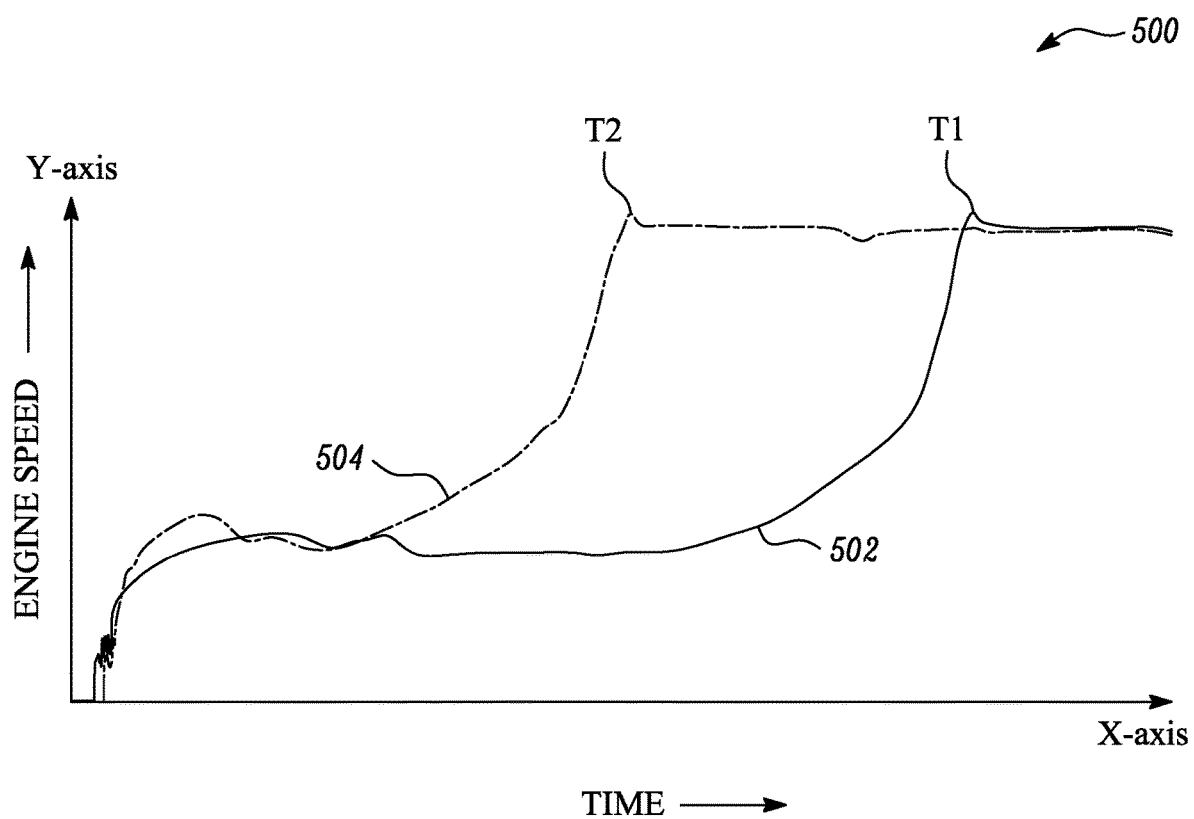
FIG. 5 is an exemplary plot depicting improvement in a starting time of an engine associated with the work machine of FIG. 1.

An improvement in the starting time of the engine 106 will now be explained in relation to FIG. 5. Referring to FIG. 5, an exemplary plot 500 is illustrated. Various time values are marked on the X-axis and various engine speed values are marked on the Y-axis. FIG. 5 illustrates a first curve 502 plotted when the lock-up clutch 210 is in the disengaged state during the starting of the engine 106. Specifically, the first curve 502 depicts time required by the engine 106 to reach different engine speed values when the lock-up clutch 210 is in the disengaged state. Further, a second curve 504 is plotted when the lock-up clutch 210 is in the engaged state during the starting of the engine 106. Specifically, the second curve 504 depicts time required by the engine 106 to reach different engine speed values when the lock-up clutch 210 is in the engaged state.

Furthermore, a first starting time T1 required for the engine 106, when the lock-up clutch 210 is in the disengaged state, is depicted in FIG. 5. Moreover, a second starting time T2 required for the engine 106, when the lock-up clutch 210 is in the engaged state, is also depicted in FIG. 5. From the plot 500, it may be concluded that the second starting time T2 required for the engine 106 when the lock-up clutch 210 is in the engaged state is shorter when compared to the first starting time T1 required for the engine 106 when the lock-up clutch 210 is in the disengaged state.

Additionally, disposing the lock-up clutch 210 in the engaged state during the starting of the engine 106 as described herein may also reduce wear and tear of the engine 106. For example, to reduce wear and tear on the engine 106, the second starting time T2 may be about 0.7× or less (e.g., in a range of about 0.5× to about 0.7×) compared to the first starting time T1. Further, the technique described herein may reduce a parasitic load on the engine 106, and a time as well as current needed by a starter to crank the engine 106. Thus, the technique described herein may decrease a cranking time of the engine 106 and may also reduce draining of a battery when the engine 106 is in the cranking state.

Figure 6:
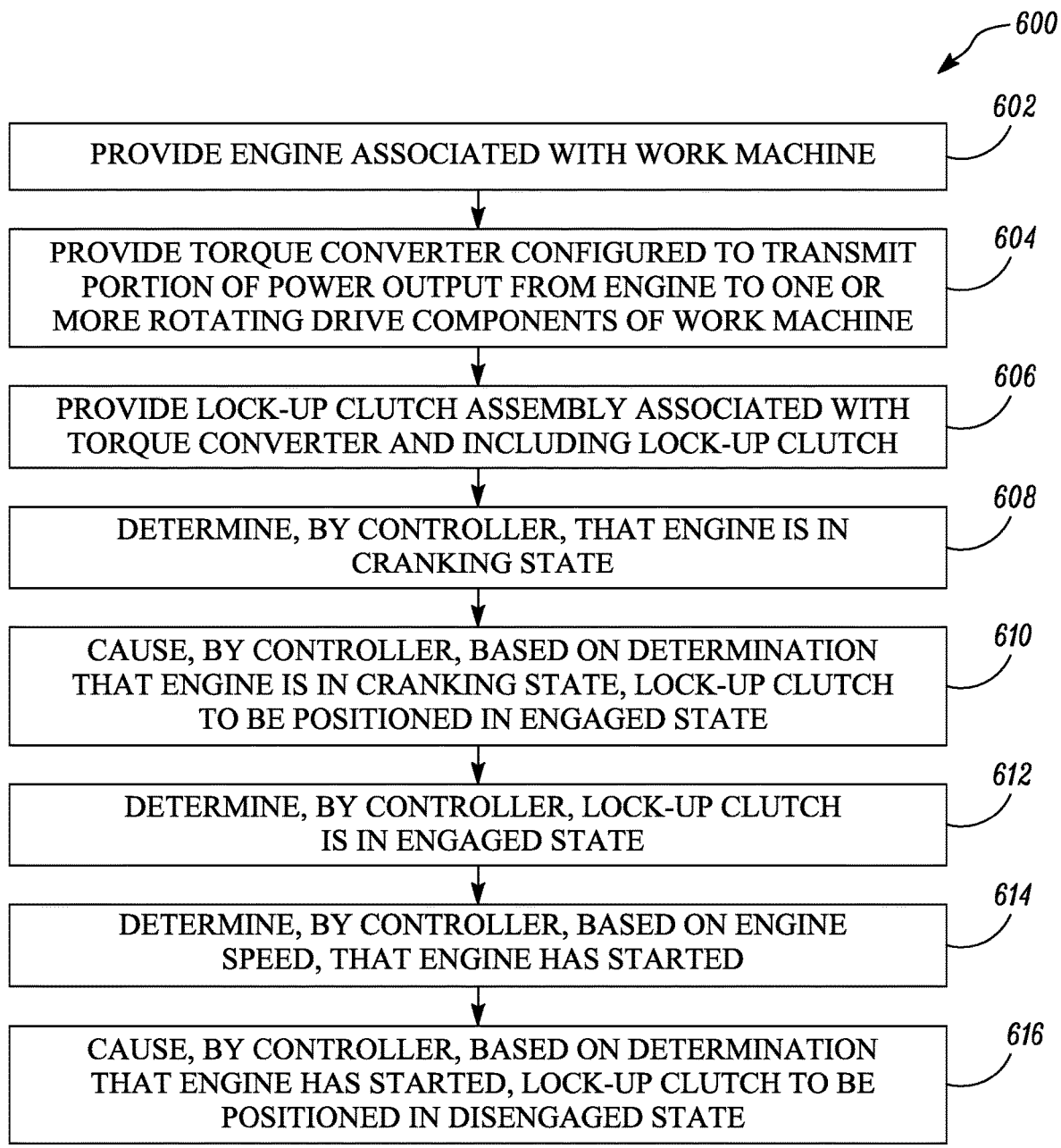
FIG. 6 is a flowchart depicting a method of operating the work machine of FIG. 1, according to an embodiment of the present disclosure.

Referring to FIG. 6, a flowchart for a method 600 of operating the work machine 100 is illustrated. At a step 602, the engine 106 associated with the work machine 100 is provided. At a step 604, the torque converter 202 is provided. The torque converter 202 transmits a portion of power output from the engine 106 to the one or more rotating drive components 108, 110, 114 of the work machine 100. The torque converter 202 includes the input shaft 204 and the output shaft 206. At a step 606, the lock-up clutch assembly 208 associated with the torque converter 202 is provided. The lock-up clutch assembly 208 includes the lock-up clutch 210. The lock-up clutch 210 is positioned in the engaged state, for bypassing the torque converter 202, or the disengaged state. In the engaged state, the input shaft 204 and the output shaft 206 of the torque converter 202 are coupled via the lock-up clutch 210. In the disengaged state, the input shaft 204 and the output shaft 206 of the torque converter 202 are not coupled via the lock-up clutch 210.

At a step 608, the controller 226 determines that the engine 106 associated with the work machine 100 is in the cranking state. At a step 610, the controller 226 causes the lock-up clutch 210, of the lock-up clutch assembly 208, to be positioned in the engaged state, based on determining that the engine 106 is in the cranking state. At a step 612, the controller 226 determines that the lock-up clutch 210 is in the engaged state. In an example, the controller 226 determines that the lock-up clutch 210 is in the engaged state based on the input speed S1 of the torque converter 202 or the output speed S2 of the torque converter 202.

At a step 614, the controller 226 determines that the engine 106 has started based on the engine speed S3. At a step 616, the controller 226 causes the lock-up clutch 210 to be positioned in the disengaged state based on determining that the engine 106 has started.

Further, the hydraulic device 212 is in selective fluid communication with the lock-up clutch assembly 208. The hydraulic device 212 directs pressurized fluid towards the lock-up clutch 210 to position the lock-up clutch 210 in the engaged state.

Furthermore, the valve 216 of the lock-up clutch assembly 208 selectively directs pressurized fluid from the hydraulic device 212 towards the lock-up clutch 210. In the open position of the valve 216, the valve 216 allows pressurized fluid to be directed towards the lock-up clutch 210 to position the lock-up clutch 210 in the engaged state. In the closed position of the valve 216, the valve 216 restricts a flow of pressurized fluid towards the lock-up clutch 210 to position the lock-up clutch 210 in the disengaged state.

Moreover, the bypass valve 218 is in selective fluid communication with the hydraulic device 212. The bypass valve 218 is disposable in the closed state or the open state. In the closed state, pressurized fluid from the hydraulic device 212 is directed towards the valve 216 of the lock-up clutch assembly 208. In the open state, pressurized fluid from the hydraulic device 212 is directed towards the sump 220 and the valve 216. Further, the method 600 includes a step at which the controller 226 causes the bypass valve 218 to be positioned in the open state based on determining that the lock-up clutch 210 is in the engaged state. Furthermore, the method 600 includes a step at which the controller 226 causes the bypass valve 218 to be positioned in the closed state based on determining that the engine 106 has started.

It may be desirable to perform one or more of the steps shown in FIG. 6 in an order different from that depicted. Furthermore, various steps could be performed together.

While aspects of the present disclosure have been particularly shown and described with reference to the embodiments above, it will be understood by those skilled in the art that various additional embodiments may be contemplated by the modification of the disclosed machine, systems and methods without departing from the spirit and scope of the disclosure. Such embodiments should be understood to fall within the scope of the present disclosure as determined based upon the claims and any equivalents thereof.

What is claimed is:

1. A control system for a work machine, the control system comprising:
    an engine associated with the work machine;
    a torque converter configured to transmit a portion of power output from the engine to one or more rotating drive components of the work machine, the torque converter including an input shaft and an output shaft;
    a lock-up clutch assembly associated with the torque converter and including a lock-up clutch, the lock-up clutch being positioned in an engaged state, for bypassing the torque converter, or a disengaged state,
    wherein, in the engaged state, the input shaft and the output shaft of the torque converter are coupled via the lock-up clutch, and
    wherein, in the disengaged state, the input shaft and the output shaft of the torque converter are not coupled via the lock-up clutch; and
    a controller communicably coupled to the lock-up clutch assembly and configured to:
        determine that the engine is in a cranking state;
        cause, based on determining that the engine is in the cranking state, the lock-up clutch to be positioned in the engaged state;
        determine that the lock-up clutch is in the engaged state;
        determine, based on an engine speed, that the engine has started; and
        cause, based on determining that the engine has started, the lock-up clutch to be positioned in the disengaged state.

2. The control system of claim 1, further comprising a hydraulic device in selective fluid communication with the lock-up clutch assembly, and wherein the hydraulic device is configured to direct pressurized fluid towards the lock-up clutch to position the lock-up clutch in the engaged state.

3. The control system of claim 2, wherein the hydraulic device includes at least one of a pump or an accumulator.

4. The control system of claim 2, wherein the lock-up clutch assembly includes a valve configured to selectively direct pressurized fluid from the hydraulic device towards the lock-up clutch, wherein, in an open position of the valve, the valve allows pressurized fluid to be directed towards the lock-up clutch to position the lock-up clutch in the engaged state, and wherein, in a closed position of the valve, the valve restricts a flow of pressurized fluid towards the lock-up clutch to position the lock-up clutch in the disengaged state.

5. The control system of claim 4, further comprising a bypass valve in selective fluid communication with the hydraulic device, the bypass valve is disposable in at least one of a closed state or an open state, wherein, in the closed state, pressurized fluid from the hydraulic device is directed towards the valve of the lock-up clutch assembly, and wherein, in the open state, pressurized fluid from the hydraulic device is directed towards a sump and the valve.

6. The control system of claim 5, wherein the controller is further configured to:
    cause, based on determining that the lock-up clutch is in the engaged state, the bypass valve to be positioned in the open state; and
    cause, based on determining that the engine has started, the bypass valve to be positioned in the closed state.

7. The control system of claim 1, wherein the controller is configured to determine that the lock-up clutch is in the engaged state based on an at least one of an input speed of the torque converter or an output speed of the torque converter.

8. A work machine comprising:
    a frame;
    one or more rotating drive components supported by the frame; and
    a control system including:
        an engine associated with the work machine;
        a torque converter configured to transmit a portion of power output from the engine to the one or more rotating drive components of the work machine, the torque converter including an input shaft and an output shaft;
        a lock-up clutch assembly associated with the torque converter and including a lock-up clutch, the lock-up clutch being positioned in an engaged state, for bypassing the torque converter, or a disengaged state,
        wherein, in the engaged state, the input shaft and the output shaft of the torque converter are coupled via the lock-up clutch, and
        wherein, in the disengaged state, the input shaft and the output shaft of the torque converter are not coupled via the lock-up clutch; and
        a controller communicably coupled to the lock-up clutch assembly and configured to:
            determine that the engine is in a cranking state;

cause, based on determining that the engine is in the cranking state, the lock-up clutch to be positioned in the engaged state;
determine that the lock-up clutch is in the engaged state;
determine, based on an engine speed, that the engine has started; and
cause, based on determining that the engine has started, the lock-up clutch to be positioned in the disengaged state.

9. The work machine of claim 8, wherein the control system further includes a hydraulic device in selective fluid communication with the lock-up clutch assembly, and wherein the hydraulic device is configured to direct pressurized fluid towards the lock-up clutch to position the lock-up clutch in the engaged state.

10. The work machine of claim 9, wherein the hydraulic device includes at least one of a pump or an accumulator.

11. The work machine of claim 9, wherein the lock-up clutch assembly includes a valve configured to selectively direct pressurized fluid from the hydraulic device towards the lock-up clutch, wherein, in an open position of the valve, the valve allows pressurized fluid to be directed towards the lock-up clutch to position the lock-up clutch in the engaged state, and wherein, in a closed position of the valve, the valve restricts a flow of pressurized fluid towards the lock-up clutch to position the lock-up clutch in the disengaged state.

12. The work machine of claim 11, further comprising a bypass valve in selective fluid communication with the hydraulic device, the bypass valve is disposable in at least one of a closed state or an open state, wherein, in the closed state, pressurized fluid from the hydraulic device is directed towards the valve of the lock-up clutch assembly, and wherein, in the open state, pressurized fluid from the hydraulic device is directed towards a sump and the valve.

13. The work machine of claim 12, wherein the controller is further configured to:
cause, based on determining that the lock-up clutch is in the engaged state, the bypass valve to be positioned in the open state; and
cause, based on determining that the engine has started, the bypass valve to be positioned in the closed state.

14. The work machine of claim 8, wherein the controller are configured to determine that the lock-up clutch is in the engaged state based on an at least one of an input speed of the torque converter or an output speed of the torque converter.

15. A method of operating a work machine, the method comprising:
determining, by a controller, that an engine associated with the work machine is in a cranking state;
causing, by the controller, based on determining that the engine is in the cranking state, a lock-up clutch, of a lock-up clutch assembly, to be positioned in the engaged state,
wherein the lock-up clutch assembly is associated with a torque converter that is configured to transmit a portion of power output from the engine to one or more rotating drive components of the work machine,
wherein the torque converter includes an input shaft and an output shaft,
wherein the lock-up clutch is positioned in an engaged state, for bypassing the torque converter, or a disengaged state,
wherein, in the engaged state, the input shaft and the output shaft of the torque converter are coupled via the lock-up clutch, and
wherein, in the disengaged state, the input shaft and the output shaft of the torque converter are not coupled via the lock-up clutch;
determining, by the controller, that the lock-up clutch is in the engaged state;
determining, by the controller, based on an engine speed, that the engine has started; and
causing, by the controller, based on determining that the engine has started, the lock-up clutch to be positioned in the disengaged state.

16. The method of claim 15, wherein a hydraulic device is in selective fluid communication with the lock-up clutch assembly, and wherein the hydraulic device is configured to direct pressurized fluid towards the lock-up clutch to position the lock-up clutch in the engaged state.

17. The method of claim 16, wherein a valve of the lock-up clutch assembly is configured to selectively direct pressurized fluid from the hydraulic device towards the lock-up clutch, wherein, in an open position of the valve, the valve allows pressurized fluid to be directed towards the lock-up clutch to position the lock-up clutch in the engaged state, and wherein, in a closed position of the valve, the valve restricts a flow of pressurized fluid towards the lock-up clutch to position the lock-up clutch in the disengaged state.

18. The method of claim 17, wherein a bypass valve is in selective fluid communication with the hydraulic device, wherein the bypass valve is disposable in at least one of a closed state or an open state, wherein, in the closed state, pressurized fluid from the hydraulic device is directed towards the valve of the lock-up clutch assembly, and wherein, in the open state, pressurized fluid from the hydraulic device is directed towards a sump and the valve.

19. The method of claim 18, further comprising:
causing, by the controller, based on determining that the lock-up clutch is in the engaged state, the bypass valve to be positioned in the open state; and
causing, by the controller, based on determining that the engine has started, the bypass valve to be positioned in the closed state.

20. The method of claim 15, further comprising:
determining, by the controller, that the lock-up clutch is in the engaged state based on an at least one of an input speed of the torque converter or an output speed of the torque converter.

* * * * *